United States Patent
Mukai et al.

(10) Patent No.: US 11,289,693 B2
(45) Date of Patent: Mar. 29, 2022

(54) SULFUR MODIFIED CELLULOSE CONTAINING LITHIUM-ION BATTERY ELECTRODE MATERIAL, LITHIUM-ION CAPACITOR ELECTRODE MATERIAL, ELECTRODE, BATTERY, CAPACITOR, ELECTRIC DEVICE, PRODUCTION METHOD FOR LITHIUM-ION BATTERY ELECTRODE MATERIAL, AND PRODUCTION METHOD FOR LITHIUM-ION CAPACITOR ELECTRODE MATERIAL

(71) Applicants: DAI-ICHI KOGYO SEIYAKU CO., LTD., Kyoto (JP); NATIONAL INSTITUTE OF ADVANCED INDUSTRIAL SCIENCE AND TECHNOLOGY, Tokyo (JP)

(72) Inventors: Takashi Mukai, Ikeda (JP); Yuta Ikeuchi, Ikeda (JP); Masahiro Yanagida, Ikeda (JP); Yasuteru Saitou, Kyoto (JP); Ayano Sofue, Kyoto (JP); Tetsuya Higashizaki, Kyoto (JP)

(73) Assignees: DAI-ICHI KOGYO SEIYAKU CO., LTD., Kyoto (JP); NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 238 days.

(21) Appl. No.: 16/637,083

(22) PCT Filed: Jul. 23, 2018

(86) PCT No.: PCT/JP2018/027432
§ 371 (c)(1),
(2) Date: Feb. 6, 2020

(87) PCT Pub. No.: WO2019/031208
PCT Pub. Date: Feb. 14, 2019

(65) Prior Publication Data
US 2020/0251720 A1 Aug. 6, 2020

(30) Foreign Application Priority Data
Aug. 8, 2017 (JP) .............................. JP2017-152821

(51) Int. Cl.
*H01M 4/137* (2010.01)
*H01G 11/06* (2013.01)
(Continued)

(52) U.S. Cl.
CPC ............ *H01M 4/137* (2013.01); *H01G 11/06* (2013.01); *H01G 11/32* (2013.01); *H01G 11/54* (2013.01);
(Continued)

(58) Field of Classification Search
None
See application file for complete search history.

(56) References Cited

U.S. PATENT DOCUMENTS

2011/0200875 A1   8/2011 Miyuki et al.
2014/0134485 A1   5/2014 Miyuki et al.
(Continued)

FOREIGN PATENT DOCUMENTS

CN   105428616 A   3/2016
CN   102891274 B   5/2017
(Continued)

OTHER PUBLICATIONS

Extended European Search Report dated Apr. 1, 2021, in European Patent Application No. 18844262.8.
(Continued)

*Primary Examiner* — Lucas J. O'Donnell
(74) *Attorney, Agent, or Firm* — Birch, Stewart, Kolasch & Birch, LLP

(57) ABSTRACT

Provided is a lithium-ion battery or lithium-ion capacitor electrode material that can compensate for the drawbacks of
(Continued)

a hydrophobic active material, that can impart hydrophilicity to the hydrophobic active material, and that can exhibit excellent dispersibility without deteriorating electrode characteristics. Specifically provided is an electrode material for a lithium-ion battery or a lithium-ion capacitor, the electrode material comprising a composite powder in which a B component is supported or coated on a surface of an A component, the A component comprising a material capable of electrochemically occluding and releasing lithium ions, the B component being sulfur-modified cellulose, and the B component being contained in an amount of 0.01 mass % or more based on 100 mass % of the total amount of the A component and the B component.

16 Claims, 3 Drawing Sheets

(51) Int. Cl.
H01G 11/32 (2013.01)
H01G 11/54 (2013.01)
H01G 11/86 (2013.01)
H01M 4/36 (2006.01)
H01M 4/60 (2006.01)
H01M 4/62 (2006.01)
H01M 10/0525 (2010.01)
H01M 4/02 (2006.01)

(52) U.S. Cl.
CPC .......... H01G 11/86 (2013.01); H01M 4/366 (2013.01); H01M 4/604 (2013.01); H01M 4/621 (2013.01); H01M 4/624 (2013.01); H01M 10/0525 (2013.01); H01M 2004/021 (2013.01)

(56) References Cited

U.S. PATENT DOCUMENTS

2014/0255780 A1 9/2014 Mikhaylik et al.
2016/0005551 A1 1/2016 Ishii
2017/0301919 A1* 10/2017 Yamashita ................ D01F 9/16
2018/0053929 A1* 2/2018 Yamashita .............. C01B 25/45
2018/0138503 A1* 5/2018 Kim ....................... H01M 4/587

FOREIGN PATENT DOCUMENTS

| JP | 2005-267853 A | 9/2005 |
| JP | 2010-153296 A | 7/2010 |
| JP | 2012-99342 A | 5/2012 |
| JP | 2012-150933 A | 8/2012 |
| JP | 2014-96326 A | 5/2014 |
| JP | 2014-96327 A | 5/2014 |
| JP | 2014-179179 A | 9/2014 |
| WO | WO 2010/044437 A1 | 4/2010 |
| WO | WO 2012/098597 A1 | 7/2012 |
| WO | WO 2013/076958 A1 | 5/2013 |
| WO | WO 2014/133067 A1 | 9/2014 |

OTHER PUBLICATIONS

International Search Report issued in PCT/JP2018/027432 (PCT/ISA/210), dated Jan. 8, 2019.
Kojima et al., "Development of all-solid-state lithium ion battery with sulfur-based cathode and SiO anode", Abstracts of the 54th Battery Symposium, 3E08, 2013, p. 344.
Kojima et al., "Development of sulfur cathode materials prepared using various organic precursors and their electrode performance", Abstracts of the 54th Battery Symposium, 1A08, 2013, p. 7.
Kojima et al., "Development of synthesis processes of organosulfur compound cathode materials", Abstracts of the 53rd Battery Symposium, 3C27, 2012, p. 202.
Miyuki et al., "Development and safety of organosulfur compound cathode materials", Abstracts of the 53rd Battery Symposium, 3C28, 2012, p. 203.
Miyuki et al., "Development of Lithium-Ion Battery Active Material and Electrode Material Technology", Science & Technology Co., Ltd., 2014, pp. 194-222 (Total No. Pgs. 30).
Written Opinion of the International Searching Authority issued in PCT/JP2018/027432 (PCT/ISA/237), dated Jan. 8, 2019.

* cited by examiner

SULFUR MODIFIED CELLULOSE CONTAINING LITHIUM-ION BATTERY ELECTRODE MATERIAL, LITHIUM-ION CAPACITOR ELECTRODE MATERIAL, ELECTRODE, BATTERY, CAPACITOR, ELECTRIC DEVICE, PRODUCTION METHOD FOR LITHIUM-ION BATTERY ELECTRODE MATERIAL, AND PRODUCTION METHOD FOR LITHIUM-ION CAPACITOR ELECTRODE MATERIAL

TECHNICAL FIELD

The present invention relates to a lithium-ion battery electrode material, a lithium-ion capacitor electrode material, an electrode, a battery, a capacitor, an electric device, a method for producing a lithium-ion battery electrode material, and a method for producing a lithium-ion capacitor electrode material.

BACKGROUND ART

In recent years, along with the spread of portable electronic devices (e.g., notebook computers, smartphones, portable game devices, and PDAs), electric vehicles, household solar power generation, etc., there has been an increasing demand for the performance of power storage devices that can be used for repeated charging and discharging. In order to further reduce the weight and enable long-term use of portable electronic devices, and to enable long-distance driving of electric vehicles, it has been required to reduce the size and increase the energy density of power storage devices. Examples of power storage devices include secondary batteries, capacitors, and the like. In particular, secondary batteries are currently used as power sources for portable electronic devices, power sources for electric vehicles, home storage batteries, and the like.

Conventionally, alkaline secondary batteries, such as nickel-cadmium (Ni—Cd) batteries and nickel-hydrogen (Ni-MH) batteries, have been the mainstream as secondary batteries; however, due to this demand for size reduction and high energy density, the use of lithium-ion batteries has tended to increase. Further, among capacitors with excellent power density, lithium-ion capacitors have high energy density, and an increase in their use for power applications is thus expected.

A lithium-ion battery is generally composed of a positive electrode, a negative electrode, an electrolyte solution or an electrolyte, a separator, and the like. The electrode (positive electrode or negative electrode) is produced, for example, by applying a slurry comprising an electrode material (mainly an active material), a binder, and a conductive aid to a current collector, followed by drying.

Lithium cobaltate ($LiCoO_2$), ternary materials ($Li(Ni, Co, Mn)O_2$), etc., are used as positive electrode materials (mainly positive electrode active materials) of commercially available lithium-ion batteries. Their practical discharge capacity is about 150 to 160 mAh/g. Since cobalt and nickel are rare metals, there has been a demand for positive electrode materials that can replace these rare metals. Further, graphite, hard carbon, lithium titanate ($Li_4Ti_5O_{12}$), etc., are used as negative electrode materials (mainly negative electrode active materials). Their practical discharge capacity is about 150 to 350 mAh/g; however, higher capacity is required.

Among various electrode materials, sulfur is known as an attractive electrode material because it has a large number of reaction electrons per unit weight, a theoretical capacity of 1672 mAh/g, and a low material cost. Further, sulfur shows a charge/discharge plateau around 2 V (vs. $Li/Li^+$), and can be used as a positive electrode or a negative electrode.

However, when an electrode made of sulfur was converted to Li (discharged when used as a positive electrode, and charged when used as a negative electrode), lithium polysulfide ($Li_2S_x$: x=2 to 8) and low-molecular-weight sulfides were formed and easily eluted into the electrolyte solution (in particular, a carbonate solvent). It was difficult to maintain a reversible and stable capacity. Therefore, in order to suppress the elution of sulfur into the electrolyte solution, there have been proposals for sulfur-based electrode materials, such as sulfur-based organic materials having a —CS—CS— or —S—S— bond, and composite materials of sulfur with materials other than sulfur.

Further, sulfur-containing organic compounds have recently been proposed as electrode materials (PTL 1 to PTL 7 and NPL 1 to NPL 5). It has been found that among them, sulfurized polyacrylonitrile (sulfur-modified polyacrylonitrile) can provide a reversible capacity of 500 to 700 mAh/g and stable life characteristics.

CITATION LIST

Patent Literature

PTL 1: WO2010/044437
PTL 2: JP2014-179179A
PTL 3: JP2014-96327A
PTL 4: JP2014-96326A
PTL 5: JP2012-150933A
PTL 6: JP2012-99342A
PTL 7: JP2010-153296A

Non-Patent Literature

NPL 1: Takuhiro MIYUKI et al., "Development of Lithium-Ion Battery Active Material and Electrode Material Technology," Science & Technology Co., Ltd., pp. 194-222 (2014)
NPL 2: Toshikatsu KOJIMA et al., Abstracts of the 53rd Battery Symposium, 3C27, p. 202 (2012)
NPL 3: Takuhiro MIYUKI et al., Abstracts of the 53rd Battery Symposium, 3C28, p. 203 (2012)
NPL 4: Toshikatsu KOJIMA et al., Abstracts of the 54th Battery Symposium, 1A08, p. 7 (2013)
NPL 5: Toshikatsu KOJIMA et al., Abstracts of the 54th Battery Symposium, 3E08, p. 344 (2013)

SUMMARY OF INVENTION

Technical Problem

In electrodes of lithium-ion batteries and lithium-ion capacitors, polyvinylidene fluoride (PVDF) is widely used and common as a binder for binding active materials. PVDF is a binder that exhibits high flexibility and excellent oxidation resistance and reduction resistance. An organic solvent, such as N-methylpyrrolidone (NMP), is preferably used as a solvent to form PVDF into a slurry. However, such organic solvents have a relatively high production cost and environmental load. For this reason, non-organic solvents are required. Further, when a sulfur-based electrode material is used, NMP dissolves sulfur in the electrode material, resulting in a decrease in electrode capacity. Moreover, PVDF easily swells in a high-temperature electrolyte solution, and PVDF swelling is a cause of lowering the electron conductivity of the electrode material layer and deteriorating the output characteristics and cycle life characteristics of the electrode. Therefore, it is desirable to use binders that do not use organic solvents, such as NMP, and that are less likely to swell in electrolyte solutions.

In recent years, aqueous binders, such as carboxymethylcellulose (CMC), acrylic resin, and alginic acid, have attracted attention as binders that are less likely to swell even in high-temperature electrolyte solutions. Due to the use of an aqueous binder in the electrode, water can be selected as a solvent of a slurry prepared in the electrode production process. Accordingly, it is promising in terms of production cost and the environment. Further, since sulfur does not dissolve in water, when water is used as the solvent of the slurry, it is possible to prevent a decrease in capacity due to the elution of sulfur into the solvent of the slurry.

However, various sulfur-based materials used as electrode materials that have been reported so far are hydrophobic and less wettable to water. Therefore, when a binder using water as a solvent or a dispersion medium (i.e., an aqueous binder) was used, it was difficult to disperse hydrophobic sulfur-based materials in the kneading step of slurry preparation. To impart hydrophilicity to increase the dispersibility of hydrophobic sulfur-based materials, it is easy to think of using a surfactant etc. However, when used in batteries, many surfactants decompose and thus generate gas when the batteries are overcharged or left at high temperatures, thereby deteriorating battery characteristics.

The present invention was made in view of the above current state of the prior art, and a main object thereof is to provide a lithium-ion battery or lithium-ion capacitor electrode material that can compensate for the drawbacks of a hydrophobic active material, that can impart hydrophilicity to the hydrophobic active material, and that can exhibit excellent dispersibility without deteriorating electrode characteristics.

Solution to Problem

As a result of intensive research while paying attention to the current state of the prior art described above, the present inventors found that when a composite powder in which cellulose modified with sulfur is supported or coated on the surface of a component comprising a material capable of electrochemically occluding and releasing lithium ions is formed, excellent dispersibility is exhibited even if water and an aqueous binder are used in the slurry production process, and that an electrode with excellent output characteristics can be obtained. The present invention has thus been completed.

A first aspect of the present invention relates to an electrode material for a lithium-ion battery or a lithium-ion capacitor, the electrode material comprising a composite powder in which a B component is supported or coated on a surface of an A component, the A component comprising a material capable of electrochemically occluding and releasing lithium ions, the B component being sulfur-modified cellulose, and the B component being contained in an amount of 0.01 mass % or more based on 100 mass % of the total amount of the A component and the B component.

In the electrode material for a lithium-ion battery or a lithium-ion capacitor, the sulfur-modified cellulose is preferably sulfur-modified cellulose nanofibers.

In the electrode material for a lithium-ion battery or a lithium-ion capacitor, the sulfur-modified cellulose nanofibers preferably have a maximum fiber diameter of 1 µm or less.

In the electrode material for a lithium-ion battery or a lithium-ion capacitor, the electrode material preferably further comprises a conductive material, and the conductive material is preferably contained in an amount of 0.1 mass % or more and 30 mass % or less based on 100 mass % of the total amount of the A component, the B component, and the conductive material.

In the electrode material for a lithium-ion battery or a lithium-ion capacitor, the material capable of electrochemically occluding and releasing lithium ions is preferably sulfur or a sulfur-based organic material.

In the electrode material for a lithium-ion battery or a lithium-ion capacitor, the material capable of electrochemically occluding and releasing lithium ions is preferably sulfur-modified polyacrylonitrile.

A second aspect of the present invention relates to an electrode for a lithium-ion battery or a lithium-ion capacitor, the electrode comprising the above electrode material. Further, the electrode for a lithium-ion battery or a lithium-ion capacitor may comprise the above electrode material and a current collector.

In the electrode for a lithium-ion battery or a lithium-ion capacitor, the electrode preferably contains a binder, and the binder is preferably an aqueous binder.

A third aspect of the present invention relates to a lithium-ion battery or a lithium-ion capacitor, each comprising a positive electrode, a negative electrode, and an electrolyte interposed between the positive electrode and the negative electrode, wherein the positive electrode or the negative electrode is the above electrode.

A fourth aspect of the present invention relates to an electric device having the above lithium-ion battery or lithium-ion capacitor.

A fifth aspect of the present invention relates to a method for producing the above electrode material for a lithium-ion battery or a lithium-ion capacitor, the method comprising the step of heating the material capable of electrochemically occluding and releasing lithium ions, a cellulose material, and sulfur to 200° C. or higher and 800° C. or lower in a state in which they are brought into contact with each other.

In the method for producing the electrode material for a lithium-ion battery or a lithium-ion capacitor, the material capable of electrochemically occluding and releasing lithium ions is preferably sulfur-modified polyacrylonitrile.

In the method for producing the electrode material for a lithium-ion battery or a lithium-ion capacitor, the method preferably further comprises, after the heating step, the step of heating to 250° C. or higher under reduced pressure or in an inert gas atmosphere.

In the method for producing the electrode material for a lithium-ion battery or a lithium-ion capacitor, a conductive material is preferably mixed after the step of heating the material capable of electrochemically occluding and releasing lithium ions, a cellulose material, and sulfur to 200° C. or higher and 800° C. or lower in a state in which they are brought into contact with each other, or after the step of heating to 250° C. or higher under reduced pressure or in an inert gas atmosphere.

In the method for producing the electrode material for a lithium-ion battery or a lithium-ion capacitor, the cellulose material is preferably cellulose nanofibers having a maximum fiber diameter of 1 μm or less.

Advantageous Effects of Invention

The present invention can provide a lithium-ion battery or lithium-ion capacitor electrode material that can compensate for the drawbacks of a hydrophobic active material, that can impart hydrophilicity to the hydrophobic active material, and that can exhibit excellent dispersibility without deteriorating electrode characteristics.

DESCRIPTION OF EMBODIMENTS

Electrode Material for Lithium-Ion Battery or Lithium-Ion Capacitor

The electrode material for a lithium-ion battery or a lithium-ion capacitor of the present disclosure comprises a composite powder in which a B component is supported or coated on a surface of an A component, the A component comprising a material capable of electrochemically occluding and releasing lithium ions, the B component being sulfur-modified cellulose, and the B component being contained in an amount of 0.01 mass % or more based on 100 mass % of the total amount of the A component and the B component.

According to this structure, even if the component A is a hydrophobic material, the hydrophilic B component, which will be described in detail later, is supported or coated on the surface of the component A, and the resulting composite powder is thus hydrophilic. Therefore, even if this composite powder is used as an electrode material, and a binder using water as a solvent or dispersion medium (aqueous binder) is used, a slurry having excellent uniformity can be easily obtained, and the time for the production of electrodes can be reduced. Therefore, according to the electrode material for a lithium-ion battery or a lithium-ion capacitor of the present disclosure, the productivity of electrodes can be greatly improved, compared with conventional electrode materials, and higher capacity and higher output of the battery or capacitor can be both satisfied. Thus, the applications for use can be expanded.

Composite Powder

In the composite powder of the present disclosure, a B component is supported or coated on the surface of an A component. For example, the B component may be supported or coated around (the surface of) the A component, which serves as a nucleus. The phrase "supported or coated" means that the surface of the A component is partially or completely coated with the B component.

Figure 1:
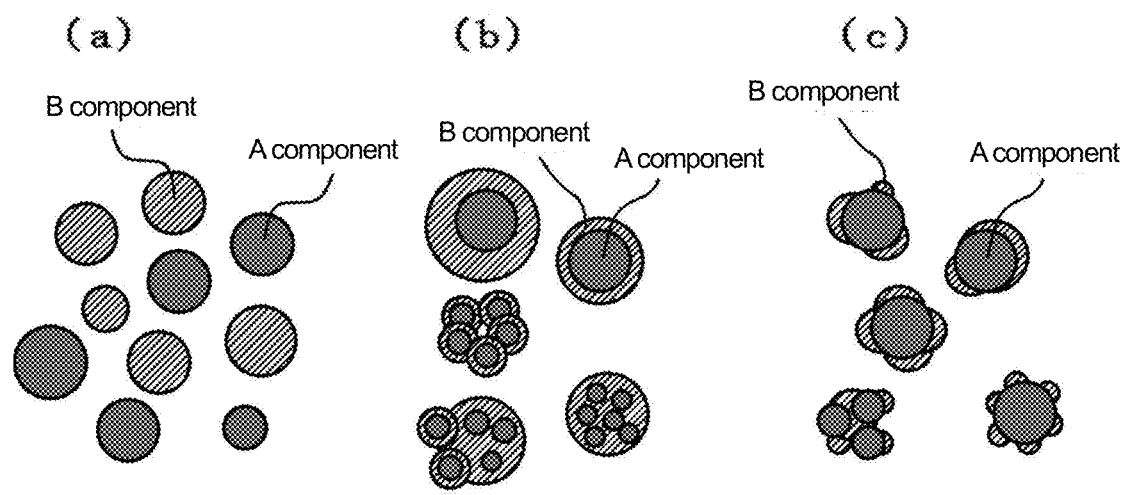
FIG. 1: Conceptual diagrams of the cross section of particles of composite powders and the cross section of particles of a simple mixed powder. (a) is a cross-sectional conceptual diagram of simple mixed powder particles, and (b) and (c) are cross-sectional conceptual diagrams of composite powder particles.

"Composite" is a concept different from "mixing." A mixed powder is a simple collection of the A component and the B component, whereas a composite powder contains both the A component and the B component in individual particles that constitute the powder. For example, FIG. 1 (a) shows a cross-sectional conceptual diagram of particles of a simple mixed powder, and FIGS. 1 (b) and (c) each show, in comparison, a cross-sectional conceptual diagram of particles of a composite powder. FIG. 1 (b) is a conceptual diagram in which the surface of the A component is completely coated with the B component, and FIG. 1 (c) is a conceptual diagram in which the surface of the A component is partially coated with (i.e., supports) the B component.

When an attempt is made to disperse the simple mixed powder of the A component and the B component in water, the B component, which alone has excellent hydrophilicity, is singly dispersed, and so the A component and the B component are easily separated. In contrast, the composite powder of the present disclosure, in which the B component is supported or coated on the surface of the A component, shows excellent dispersibility in water, and can be put into a state in which both the A component and the B component are dispersed.

The composite powder in which the B component is supported or coated on the surface of the A component preferably has a median diameter (D50) of 0.1 μm or more and 30 μm or less, more preferably 0.5 μm or more and 15 μm or less, and even more preferably 0.55 μm or more and 14.5 μm or less. Because the median diameter (D50) of the composite powder is within the above range, the resulting electrode material can have excellent output characteristics and cycle life characteristics. When the median diameter is 0.1 μm or more, the specific surface area does not increase too much, and the amount of binder necessary for electrode formation does not increase. As a result, the output characteristics and energy density of the electrode are excellent. In contrast, when the median diameter is 30 μm or less, it is easy to adjust the capacitance in designing the capacitance per unit area of the electrode.

Here, the median diameter (D50) means a particle diameter at which the cumulative frequency in terms of volume is 50%, measured using a laser diffraction/scattering particle size distribution measurement method; the same applies hereinafter. As the measurement device, for example, "LA-960" produced by Horiba can be used.

As the ratio of the A component to the B component in the entire composite powder, when the total amount of both components is 100 mass %, the amount of the B component is 0.01 mass % or more, preferably 0.1 mass % or more, and more preferably 0.5 mass % or more. When the amount of the B component is 0.01 mass % or more, the effect of imparting hydrophilicity to the A component is excellent, and sufficient dispersibility is exhibited in the production of a slurry using an aqueous binder. Only for the purpose of imparting hydrophilicity to the A component, it is not necessary to add more than 10 mass % of the B component, and the amount thereof may be 10 mass % or less.

A Component

The A component comprises a material capable of electrochemically occluding and releasing lithium ions. The A component is not particularly limited as long as it is an electrode material capable of electrochemically occluding and releasing lithium ions. Electrochemical occlusion of lithium ions means, for example, reversible formation of alloys (including solid solutions and intermetallic compounds) with lithium, reversible chemical bonding with lithium, and reversible inclusion of lithium. Electrochemical release of lithium ions means release of the occluded lithium ions.

The A component contains, for example, at least one or more elements selected from the group consisting of Li, Na, C, Mg, Al, Si, P, S, K, Ca, Sc, Ti, V, Cr, Mn, Fe, Co, Ni, Cu, Zn, Ga, Ge, Y, Zr, Nb, Mo, Pd, Ag, Cd, In, Sn, Sb, W, Pb, and Bi. Other examples include alloys containing these elements; oxides, sulfides, and halides of these elements; and sulfur-based organic materials, such as sulfur-modified compounds of organic compounds.

Among these, preferable are S (sulfur), sulfides of the above elements, and sulfur-based organic materials, such as sulfur-modified compounds of organic compounds, because they show a charge/discharge plateau region close to that of the B component (sulfur-modified cellulose). Examples of sulfides of the above elements or sulfur-based organic materials, such as sulfur-modified compounds of organic compounds, include metal sulfide, sulfur composite carbon, sulfur-modified natural rubber, sulfur-modified pitch, sulfur-modified anthracene, sulfur-modified polyacryl, sulfur-modified phenol, sulfur-modified polyolefin, sulfur-modified polyvinyl alcohol, sulfur-modified nylon, sulfur-modified vinyl acetate copolymer, sulfur-modified terephthalic acid, sulfur-modified diaminobenzoic acid, sulfur-modified methacrylic resin, sulfur-modified polycarbonate, sulfur-modified polystyrene, sulfur-modified N-vinylformaldehyde copolymer, sulfur-modified polyacrylonitrile, and the like. The A components may be used singly or in combination of two or more.

Among these, sulfur-modified polyacrylonitrile is particularly preferable because it can stably exhibit a reversible capacitance of 500 to 700 mAh/g.

The A component is in the form of particles, and the median diameter (D50) is preferably 0.1 µm or more and 30 µm or less, more preferably 0.5 µm or more and 15 µm or less, and even more preferably 0.55 µm or more and 14.5 µm or less. When the median diameter (D50) is within the above range, the surface smoothness of the resulting electrode is not deteriorated, and the B component is easily supported or coated on the surface of the A component.

B Component

The B component is sulfur-modified cellulose. Sulfur-modified cellulose refers to a material obtained by dehydrogenation of cellulose for sulfurization, and comprises a carbon skeleton derived from cellulose and sulfur bonded to the carbon skeleton. Sulfur-modified cellulose changes in appearance from white of its precursor (cellulose) to black, exhibits excellent hydrophilicity, and is insoluble in water.

The differences between cellulose and sulfur-modified cellulose are described here. Cellulose has the property of swelling upon dispersion in water or absorption of water, and loses weight at 180° C. or higher and starts carbonization. However, sulfur-modified cellulose is hydrophilic but insoluble in water; thus, it does not swell in water, has a weight loss of 30 mass % or less even at 400° C., and exhibits excellent heat resistance. In elemental analysis, 10 to 60 mass %, or 20 to 60 mass %, of sulfur-modified cellulose may be composed of sulfur, although it varies depending on the raw material amount, the heat treatment temperature, and other production conditions.

Conductive Material

The electrode material for a lithium-ion battery or a lithium-ion capacitor of the present disclosure may contain optional components, such as conductive materials, in addition to a composite powder in which a B component is supported or coated on the surface of an A component.

The electrode material for a lithium-ion battery or a lithium-ion capacitor preferably contains a conductive material. This is because much higher output of the electrode material can be expected. In particular, it is preferable that a conductive material is contained, for example, in the B component so as to be supported or coated on the surface of the A component, because hydrophilicity and conductivity can both be imparted to the surface of the A component.

As the method for producing an electrode material containing a conductive material, for example, the A component, a precursor of the B component, the conductive material, and sulfur are dispersed in a solvent, such as water, followed by heat treatment. If lumps (agglomerates or aggregates) are formed when the A component is dispersed in a solvent, such as water, dispersibility in the solvent, such as water, can be improved by using a surfactant, an alcohol, or the like in combination. The surfactant, alcohol, or the like used in combination is decomposed or vaporized by heat treatment, and thus does not adversely affect the electrode material.

The conductive material refers to a material having electronic conductivity. Examples include metals selected from C (carbon), Al (aluminum), Ti (titanium), V (vanadium), Cr (chromium), Fe (iron), Co (cobalt), Ni (nickel), Cu (copper), Ta (tantalum), Pt (platinum), and Au (gold); alloys of these metals; and ceramics and polymers having conductivity. Among these, carbon is preferable in terms of low conductivity, material cost, and irreversible capacity. Examples of carbon include graphite, carbon black, carbon fibers, carbon nanotubes, carbon nanohorns, graphene, hard carbon, soft carbon, glassy carbon, vapor-grown carbon fibers (VGCFs; registered trademark), and the like. Of these, carbon black is particularly preferable. Although carbon black has different properties depending on the production method, furnace black (FB), channel black, acetylene black (AB), thermal black, lamp black, Ketjen black (KB; registered trademark), and the like can be used without any problem. The conductive materials may be used singly or in combination of two or more.

The content of the conductive material is preferably 0.1 mass % or more and 30 mass % or less based on 100 mass % of the total amount of the composite powder in which the B component is supported or coated on the surface of the A component (i.e., the A component and the B component), and the conductive material. The content of the conductive material is preferably 0.1 mass % or more because the effect of imparting conductivity is sufficient, and the content of the conductive material is preferably 30 mass % or less because the active material capacity does not decrease too much.

When the conductive material is contained as an electrode material, it is preferable to mix it after desulfurization treatment in the production of the composite powder in which the B component is supported or coated on the surface of the A component.

Production of Electrode Material for Lithium-Ion Battery or Lithium-Ion Capacitor First, the production of a composite powder in which a B component is supported or coated on the surface of an A component, contained in the electrode material for a lithium-ion battery or a lithium-ion capacitor is described. The B component (sulfur-modified cellulose) can be obtained by a step of heat treatment using a cellulose material (precursor)

and sulfur as raw materials in a state in which the cellulose material is brought into contact with sulfur. The state in which cellulose is brought into contact with sulfur may be such that the cellulose material and sulfur are in physical contact with each other. Examples include a solid powder obtained by mixing a cellulose material and sulfur, and a product obtained by dispersing a cellulose material and sulfur in a solvent, followed by drying. In this way, heat treatment is performed while bringing cellulose into contact with sulfur, whereby sulfur is solid-phase diffused into cellulose, so that the B component (sulfur-modified cellulose) can be obtained with high yield.

The heat treatment may be performed at any temperature at which cellulose is modified with sulfur. The temperature is preferably 200° C. or higher and 800° C. or lower. Thus, sulfur-modified cellulose comprising a carbon skeleton derived from the cellulose material, and sulfur bonded to the carbon skeleton can be synthesized. When the temperature is 200° C. or higher, the cellulose material is sufficiently sulfur-modified, and the resulting sulfur-modified cellulose has a higher conductivity than that obtained at less than 200° C. Moreover, when the temperature is 800° C. or lower, sulfur is less likely to be desorbed from the sulfur-modified cellulose, and the sulfur content is less likely to decrease; thus, a carbide is formed, and the capacitance of the electrode material can be prevented from decreasing. In terms of high yield and capacitance of sulfur-modified cellulose, the temperature is more preferably 220° C. or higher and 600° C. or lower. Further, in terms of excellent conductivity of sulfur-modified cellulose, the temperature is even more preferably 250° C. or higher and 500° C. or lower.

The atmosphere during heat treatment is not particularly limited; however, a non-oxygen atmosphere, such as an inert gas atmosphere or a reducing atmosphere, is preferable because oxygen in the air would lead to oxidation. Specific examples include a reduced pressure atmosphere, a helium atmosphere, a neon atmosphere, an argon atmosphere, a nitrogen atmosphere, a hydrogen atmosphere, and a sulfur gas atmosphere.

The heat treatment time may be set so that sulfur-modified cellulose is produced. The heat treatment time may be 1 hour or more and 50 hours or less, or 1 hour or more and 40 hours or less. This range is preferable because cellulose is sufficiently sulfur-modified and the resulting composite powder has excellent capacitance. Further, since the heating time is not too long, the sulfur modification reaction proceeds sufficiently and heating energy is not wasted, which is economically preferable.

The weight of sulfur as a raw material may be equal to or more than the weight of the cellulose material. Specifically, for example, the weight of sulfur is preferably 1 time or more and 10 times or less, and more preferably 2 times or more and 6 times or less, the weight of the cellulose material. When the weight of sulfur is 1 time or more the weight of the cellulose material, sulfur modification sufficiently occurs, and the resulting electrode material has excellent capacitance. When the weight of sulfur is 10 times or less the weight of the cellulose material, sulfur as a raw material is less likely to remain in the resulting electrode material, and it does not take time to perform desulfurization treatment in a subsequent step. If hydrophobic sulfur remains, the resulting electrode material may not exhibit sufficient hydrophilicity. If the electrode material does not exhibit sufficient hydrophilicity, desulfurization treatment can be performed.

The cellulose material, which is a precursor of the B component (sulfur-modified cellulose), may be a carbohydrate represented by the molecular formula $(C_6H_{10}O_5)_n$, or a derivative thereof. The derivative of the carbohydrate represented by the molecular formula $(C_6H_{10}O_5)_n$ refers to a compound that has been modified by, for example, introduction of a functional group, oxidation, reduction, or atom substitution, to such an extent that the structure and properties of the carbohydrate represented by the molecular formula $(C_6H_{10}O_5)_n$ are not significantly changed. Examples include methylcellulose, ethylcellulose, ethylmethylcellulose, carboxymethylcellulose (CMC), hydroxyethylcellulose, hydroxybutylmethylcellulose, hydroxypropylcellulose, hydroxypropylmethylcellulose, hydroxyethylmethylcellulose, hydroxypropylmethylcellulose stearoxy ether, carboxymethylhydroxyethylcellulose, alkylhydroxyethylcellulose, nonoxynyl hydroxyethylcellulose, and alkali metal salts thereof, cellulose sulfate, cellulose acetate, methylcellulose ether, methylethylcellulose ether, ethylcellulose ether, low-nitrogen hydroxyethylcellulose dimethyldiallylammonium chloride (polyquaternium-4), chloride-[2-hydroxy-3-(trimethylammonio)propyl]hydroxyethylcellulose (polyquaternium-10), chloride-[2-hydroxy-3-(lauryldimethylammonio) propyl]hydroxyethylcellulose (polyquaternium-24), hemicellulose, microcrystalline cellulose, cellulose nanocrystals, cellulose nanofibers (CeNFs), and the like. Of these cellulose materials as precursors, CeNFs are preferable.

CeNFs are cellulose fibers obtained by physically or chemically loosening cellulose as a constituent material of wood etc., or cellulose obtained from animals, algae, or bacteria, to a maximum fiber diameter of 1 μm or less. More specifically, cellulose fibers having a cellulose fiber length of 0.2 μm or more, an aspect ratio (cellulose fiber length/cellulose fiber diameter (fiber diameter)) of 10 or more and 100000 or less, and an average degree of polymerization of 100 to 100000 are preferable; and cellulose fibers having a cellulose fiber length of 0.5 μm or more, an aspect ratio (cellulose fiber length/cellulose fiber diameter (fiber diameter)) of 10 or more and 250 or less, and an average degree of polymerization of 100 to 10000 are more preferable. The average degree of polymerization mentioned herein refers to a value calculated by the viscosity method described in the TAPPI T230 standard method.

Further, the above CeNFs are preferably cellulose fibers having an anionic group because the cellulose fibers can be efficiently defibrated to a predetermined fiber diameter.

The anionic group is not particularly limited, and may be a carboxylic acid group, a phosphoric acid group, a sulfonic acid group, a sulfuric acid group, or a group that forms a salt with any of these groups. These groups may be contained singly or in combination of two or more.

The type of salt is not particularly limited. Examples include alkali metal salts, such as sodium salt, potassium salt, and lithium salt; alkaline earth metal salts, such as magnesium salt, calcium salt, and barium salt; onium salts, such as ammonium salt and phosphonium salt; amine salts, such as primary amines, secondary amines, and tertiary amines; and the like.

As described above, anionic groups include acid types, such as a carboxylic acid group, a phosphoric acid group, a sulfonic acid group, and a sulfuric acid group; and salt types, such as a carboxylate group, a phosphate group, a sulfonate group, and a sulfate group. In a preferable embodiment, a salt-type anionic group is contained. Cellulose fibers having only a salt-type anionic group may be used, or cellulose fibers having a mixture of a salt-type anionic group and an acid-type anionic group may be used.

When cellulose nanofibers (CeNFs) are used as a precursor of the B component (sulfur-modified cellulose), the resulting sulfur-modified cellulose is sulfur-modified cellulose nanofibers (S-CeNFs). It is preferable that the B component is fibrous sulfur-modified cellulose nanofibers (S-CeNFs) because a conductive three-dimensional network structure can be formed on the surface of the A component, and a sufficient current-collecting effect can be obtained as an active material of the electrode.

S-CeNFs do not dissolve or swell in water, and exhibit excellent hydrophilicity. Further, S-CeNFs can stably show a reversible capacitance of 300 to 400 mAh/g.

Therefore, when S-CeNFs as the B component are supported or coated on the surface of the A component, not only can hydrophilicity be imparted, but also an increase in the capacity of the electrode can be expected. Further, S-CeNFs are fibrous and thus can form a three-dimensional network structure on the surface of the A component. If a three-dimensional network structure is formed by S-CeNFs, the A component can be brought into contact with an electrolyte solution, and sufficient output characteristics can be obtained as the electrode material.

In terms of forming a three-dimensional network structure on the surface of the component A, S-CeNFs preferably have a maximum fiber diameter of 1 μm or less. More specifically, the fiber length is preferably 0.2 μm or more, and the aspect ratio (S—CeNF length/S—CeNF diameter) is preferably 10 or more and 100000 or less. Further, in term of excellent output characteristics of the battery or capacitor, it is more preferable that the maximum fiber diameter is 1 nm or more and 500 nm or less, the fiber length is 0.5 μm or more, and the aspect ratio is 8 or more and 50000 or less; and it is more preferable that the maximum fiber diameter is 2 nm or more and 200 nm or less, the fiber length is 0.8 μm or more, and the aspect ratio is 25 or more and 10000 or less. A composite powder in which sulfur-modified cellulose nanofibers with a three-dimensional network structure are supported or coated on the surface of the A component can be obtained. Further, without deteriorating the electrode characteristics originally expected from the A component, specifically output characteristics and cycle life characteristics, hydrophilicity can be imparted to the A component, and excellent dispersibility can be exhibited.

The maximum fiber diameter is obtained by randomly selecting at least 10 or more fibers from a fiber image obtained by an electron microscope etc., determining the maximum length value of each fiber in the minor axis direction, and averaging the maximum values. The average fiber diameter is obtained by randomly selecting at least 10 or more fibers from a fiber image obtained by an electron microscope, etc., and determining the average value of the lengths of the fibers in the minor axis direction.

The aspect ratio is determined by fiber length/fiber diameter (average fiber diameter), and the fiber length and the fiber diameter are obtained in the following manner. In the present disclosure, the fiber length is a value measured by a FS-200 Fiber Length Analyzer (produced by Kajaani Automation Inc.). The fiber length can also be measured by a device equivalent to this analyzer.

The method for obtaining a composite powder in which a B component is supported or coated on the surface of an A component is not particularly limited. Examples of the method include a mechanical milling method, a spray drying method, a fluidized bed granulation method, a firing and grinding method, and the like.

In the mechanical milling method, external forces, such as impact, tension, friction, compression, and shear, are applied to a raw material powder (at least the A component and the B component). For example, a rolling mill, a vibration mill, a planetary mill, a swing mill, a horizontal mill, a ball mill, an attritor mill, a jet mill, a stirring crusher, a homogenizer, a fluidizer, a paint shaker, a mixer, and the like can be used. This method can form a composite in which the B component is supported or coated on the surface of the A component. However, in this method, it is preferable that the B component has a lower mechanical strength than the A component. That is, it is preferable that the B component is more easily ground than the A component. The B component, which has preferentially become fine particles, is mechanically pressure-bonded to the surface of the A component; thus, the B component can be supported or coated on the A component.

In the spray drying method, a liquid obtained by dispersing an A component and a B component in water or an organic solvent is spray-dried to thereby form a composite in which the B component is supported or coated on the surface of the A component. When the A component is a hydrophobic material, it is preferable to use an organic solvent to disperse the A component. In particular, in the case of sulfur or a sulfur-based organic material, it is preferable to use a solvent obtained by adding a surfactant, an alcohol, or the like to water. The surfactant, alcohol, or the like is decomposed or vaporized by heat treatment, and thus does not adversely affect the electrode material.

In the fluidized bed granulation method, a solvent in which a B component is dispersed is sprayed to an A component, while sending hot air from a lower part of a granulation chamber containing the A component so that the A component is wound up in the air and fluidized, thereby forming a composite in which the B component is supported or coated on the surface of the A component. Further, in the case of sulfur or a sulfur-based organic material, a solvent in which a B component precursor is dispersed is sprayed to an A component precursor, while sending hot air from a lower part of a granulation chamber containing the A component precursor so that the A component precursor is wound up in the air and fluidized, thereby forming a composite powder in which the B component precursor is supported or coated on the surface of the A component precursor, after which heat treatment is performed at 200° C. or higher while bringing the composite powder into contact with sulfur, whereby a composite in which the B component is supported or coated on the surface of A component can also be formed.

In the firing and grinding method, an A component, a precursor of a B component, and sulfur are dispersed in a solvent, and the resulting dispersion is subjected to heat treatment at 200° C. or higher, followed by grinding, thereby forming a composite powder in which the B component is supported or coated on the surface of the A component. Moreover, in the case of sulfur or a sulfur-based organic material, a precursor of the A component, a precursor of the B component, and sulfur are dispersed in a solvent, and the resulting dispersion is then subjected to heat treatment, followed by grinding, thereby forming a composite in which the B component is supported or coated on the surface of the A component. The solvent used in the firing and grinding method is preferably a solvent obtained by adding a surfactant, an alcohol, or the like to water. The surfactant, alcohol, or the like is decomposed or vaporized by heat treatment, and thus does not adversely affect the electrode material.

In the method, such as the mechanical milling method, the spray drying method, the fluidized bed granulation method, or the firing and grinding method, when production is performed after an A component is first prepared, particularly when the A component is sulfur or a sulfur-based organic material, the A component is obtained by heat treatment to sulfurize the above element or to sulfur-modify an organic compound. The organic compound is preferably polyacrylonitrile (PAN) in terms of large capacitance and excellent life characteristics.

In addition to the mechanical milling method, the spray drying method, the fluidized bed granulation method, and the firing and grinding method, a composite powder in which a B component is supported or coated on the surface of an A component can also be obtained by a step of heating a material capable of occluding and releasing lithium ions, a cellulose material, and sulfur to 200° C. or higher and 800° C. or lower in a state in which they are brought into contact with each other.

Moreover, when the A component is sulfur-modified polyacrylonitrile obtained by sulfur-modifying polyacrylonitrile (PAN), the following method can be used to obtain a composite powder in which the B component is supported or coated on the surface of the A component. PAN, a cellulose material, and sulfur are used as raw materials, and heated to 200° C. or higher and 800° C. or lower in a state in which PAN and cellulose are brought into contact with sulfur, whereby PAN is converted into sulfur-modified polyacrylonitrile (S-PAN; corresponding to the A component), the cellulose material is converted into sulfur-modified cellulose (corresponding to the B component), and at the same time, a composite powder in which the B component is supported or coated on the surface of the A component can be obtained.

The weight of sulfur as a raw material may be equal to or more than the weight of each of PAN and the cellulose material. Specifically, the amount of sulfur is preferably 1 time or more and 10 times or less, and more preferably 2 times or more and 6 times or less, the weight of each of PAN and the cellulose material. When the weight of sulfur as a raw material is 1 time or more the weight of each of PAN and the cellulose material, sulfur modification sufficiently occurs, and the resulting electrode material has excellent capacitance. When the weight of sulfur is 10 times or less the weight of each of PAN and the cellulose material, sulfur as a raw material is less likely to remain in the resulting electrode material, and it does not take time to perform desulfurization treatment in a subsequent step. If elemental sulfur remains in the electrode material, the initial capacitance increases; however, cycle life characteristics may be deteriorated. In such a case, it is preferable to perform desulfurization treatment.

The desulfurization treatment is a treatment to remove elemental sulfur contained in the produced composite powder, and is not limited as long as residual sulfur can be removed by heat treatment or reduced-pressure treatment. For example, a composite powder is obtained and then heated to 250° C. or higher under reduced pressure or in an inert gas atmosphere. Residual sulfur can be removed well by performing this heating for about 1 to 20 hours. The upper limit of the heating temperature is not particularly limited, but may be 800° C. or lower in terms of large capacitance of the electrode material. Alternatively, residual sulfur may be dissolved in carbon disulfide after the composite powder is obtained. However, carbon disulfide is highly toxic, and the above desulfurization treatment by heating is thus preferable.

Electrode for Lithium-Ion Battery or Lithium-Ion Capacitor

The lithium-ion battery electrode of the present disclosure comprises the lithium-ion battery electrode material of the present disclosure. The lithium-ion capacitor electrode of the present disclosure comprises the lithium-ion capacitor electrode material of the present disclosure. The lithium-ion battery electrode or lithium-ion capacitor electrode comprises the electrode material of the present disclosure and a current collector, and the electrode material may be integrated with the current collector. Further, the lithium-ion battery electrode or the lithium-ion capacitor electrode may contain optional components, such as binders and conductive aids, in addition to the electrode material of the present disclosure.

In the electrode for a lithium-ion battery or a lithium-ion capacitor of the present disclosure, the composite powder in which the B component is supported or coated on the surface of the A component in the electrode material of the present disclosure is mainly used as an active material. The active material refers to a substance that can electrochemically occlude and release lithium ions.

Specifically, for example, the lithium-ion battery electrode material or lithium-ion capacitor electrode material of the present disclosure, a binder, and a conductive aid are sufficiently kneaded with the addition of an appropriate solvent, such as N-methyl-pyrrolidone (NMP), water, alcohol, xylene, or toluene, thereby obtaining an electrode slurry. The slurry is applied to the surface of a current collector and dried, followed by pressure control, thereby forming an active material-containing layer on the surface of the current collector. Thus, a battery electrode can be obtained.

The current collector is not particularly limited as long as it is a material that has electron conductivity and that can energize the holding negative electrode material. Examples include conductive materials, such as C, Ti, Cr, Fe, Mo, Ru, Rh, Ta, W, Os, Ir, Pt, Au, Cu, Ni, and Al; alloys containing two or more of these conductive materials (e.g., stainless steel); and the like. In terms of high electron conductivity, excellent stability in the electrolyte solution, and excellent oxidation resistance and reduction resistance, the current collector is preferably C, Al, Cu, Ni, stainless steel, or the like, and more preferably C, Al, or stainless steel.

The shape of the current collector is not particularly limited. For example, a foil-like base material or a three-dimensional base material can be used. Examples of the three-dimensional base material include foam metal, mesh, woven fabric, non-woven fabric, expanded metal, and the like. When a three-dimensional base material is used, an electrode with a high capacity density can be obtained even with a binder that lacks adhesion to the current collector. In addition, high-rate charge/discharge characteristics are also improved.

Moreover, even in the case of a foil-like current collector, higher output can be achieved by forming a primer layer in advance on the surface of the current collector. The primer layer may be any layer that has good adhesion to both the electrode material layer and the current collector, and that has conductivity. For example, a primer layer can be formed by applying a binding material obtained by mixing a carbon-based conductive aid, a primer binder, etc., to the current collector. The thickness of the primer layer is, for example, 0.1 µm to 20 µm. As the primer binder, known binders used for electrodes can be used.

Binder

The binder contained as an optional component in the electrode for a lithium-ion battery or a lithium-ion capacitor is not limited as long as it is conventionally used as a binder for electrodes for lithium-ion batteries or lithium-ion capacitors. Examples include carboxymethylcellulose salt (CMC), acrylic resin, alginate, polyvinylidene fluoride (PVDF), polyimide (PI), polytetrafluoroethylene (PTFE), polyamide, polyamide imide, styrene butadiene rubber (SBR), polyurethane, styrene-ethylene-butylene-styrene copolymer (SEBS), styrene-butadiene-styrene copolymer (SBS), styrene-isoprene-styrene copolymer (SIS), styrene-ethylene-propylene-styrene copolymer (SEPS), polyvinyl alcohol (PVA), polyvinyl butyral (PVB), polyethylene (PE), polypropylene (PP), polyester resin, polyvinyl chloride, ethylene acetate copolymer (EVA), and the like. These may be used singly or in combination of two or more.

Among the above binders, CMC, acrylic resin, alginate, PVA, SBR, etc., are preferably used because they are aqueous binders that can use water as a solvent or dispersion medium. The use of aqueous binders is preferable because they suppress the elution of sulfur into the slurry solvent and improve the high temperature durability of the electrode.

In general, when an electrode is composed of an aqueous binder and a hydrophobic electrode material (in particular, an active material), the hydrophobic material repels water to form lumps (e.g., agglomerates or aggregates), and so it is less likely to be dispersed. In the composite powder of the present disclosure, the B component having excellent hydrophilicity is supported or coated on the surface of the A component; thus, the use of an aqueous binder does not cause difficulty in dispersion.

The content of the binder is preferably 0.1 mass % or more and 30 mass % or less, and more preferably 0.5 mass % or more and 15 mass % or less, based on 100 mass % of the total amount of the composite powder in which the B component is supported or coated on the surface of the A component (i.e., the A component and the B component) and the binder. When the content of the binder is out of the above range, the resulting electrode is less likely to obtain stable life characteristics and output characteristics. That is, if the binder content is small, the binding force with the current collector is not sufficient, and it is thus difficult to obtain stable life characteristics. Conversely, if the binder content is too large, the electrode resistance increases and the output characteristics decrease.

Conductive Aid

The conductive aid is a substance that helps conductivity between active materials and refers to a material that is filled or crosslinked between distant active materials to conduct between the active materials or between the active material and the current collector.

As the conductive aid contained as an optional component in the lithium-ion battery electrode or capacitor electrode, those conventionally used as conductive aids for lithium-ion battery electrodes or capacitor electrodes can be used. Examples include carbon materials, such as acetylene black (AB), Ketjen black (KB), graphite, carbon fibers, carbon nanotubes, graphene, amorphous carbon, and vapor-grown carbon fibers (VGCFs). The conductive aids may be used singly or in combination of two or more.

Among these, materials that can form a conductive three-dimensional network structure are preferable. Examples of materials that can form a conductive three-dimensional network structure include flake-like conductive materials, such as flake aluminum powder and flake stainless steel powder; carbon fibers; carbon tubes; amorphous carbon; and the like. When a conductive three-dimensional network structure is formed, a sufficient current-collecting effect can be obtained, and volume expansion of the electrode during charge and discharge can be effectively suppressed.

The content of the conductive aid is preferably 0 mass % or more and 20 mass % or less, and more preferably 1 mass % or more and 10 mass % or less, based on 100 mass % of the total amount of the composite powder in which the B component is supported or coated on the surface of the A component (i.e., the A component and the B component), and the conductive aid. When the content of the conductive aid is within the above range, the battery has excellent output characteristics and less of a decrease in capacity. That is, the conductive aid is contained as necessary.

Lithium-Ion Battery or Capacitor

The lithium-ion battery electrode of the present disclosure can be used to obtain a lithium-ion battery. The lithium-ion battery comprises a positive electrode, a negative electrode, and an electrolyte interposed between the positive electrode and the negative electrode. The electrode of the present disclosure can be used as the positive electrode or the negative electrode of the lithium-ion battery. That is, the electrode of the present disclosure can be used as either the positive electrode or the negative electrode of the lithium-ion battery, except that the positive electrode and the negative electrode simultaneously use the exact same electrodes among the electrodes of the present disclosure. When the above electrode is used as a positive electrode of a lithium-ion battery, the lithium-ion battery can be produced by combining it with an electrode with charge/discharge potential lower than that of the above electrode. On the other hand, when the above electrode is used as a negative electrode of a lithium-ion battery, the lithium-ion battery can be produced by combining it with an electrode with charge/discharge potential nobler than that of the above electrode.

Moreover, the lithium-ion capacitor electrode of the present disclosure can be used to obtain a lithium-ion capacitor. The lithium-ion capacitor also comprises a positive electrode, a negative electrode, and an electrolyte interposed between the positive electrode and the negative electrode. When the electrode of the present disclosure is used as an electrode of a lithium-ion capacitor, this electrode can be used as either the positive electrode or the negative electrode, and the exact same electrodes may be used as the positive electrode and the negative electrode.

When the exact same electrodes are used, it is preferable to use a negative electrode obtained by doping lithium ions in advance into an electrode serving as the negative electrode, before the lithium-ion capacitor is assembled.

The method for doping lithium ions is not particularly limited as long as the electrode can be doped with lithium. Examples include (1) electrochemical doping, (2) lithium metal foil bonding doping, (3) mechanical lithium doping using a high-speed planetary mill, and the like that are described in the following non-patent literature: Daichi SAKAMOTO et al., "Measurement and Analysis Data for Lithium Secondary Battery Materials," Technical Information Institute Co., Ltd., Section 30, pp. 200-205.

When the above electrode is used as a positive electrode, examples of the counter electrode (negative electrode) include electrodes containing at least one or more elements selected from the group consisting of Li, Na, C, Mg, Al, Si, P, K, Ca, Sc, Ti, V, Cr, Mn, Fe, Co, Ni, Cu, Zn, Ga, Ge, Y, Zr, Nb, Mo, Pd, Ag, Cd, In, Sn, Sb, W, Pb, and Bi; alloys containing these elements; oxides, sulfides, and halides of these elements; sulfur-based organic materials, such as sulfur-modified compounds of organic compounds; and like materials (i.e., negative electrode materials). These negative electrode materials may be used singly or in combination of two or more.

When the above electrode is used as a negative electrode, the counter electrode (positive electrode) is, for example, a known electrode containing a lithium transition metal oxide, such as $LiCoO_2$, $LiNiO_2$, $LiMnO_2$, $LiNi_{0.33}Mn_{0.33}Co_{0.33}O_2$, $LiNi_{0.5}Mn_{0.3}Co_{0.2}O_2$, $LiNi_{0.6}Mn_{0.2}Co_{0.2}O_2$, $LiNi_{0.8}Mn_{0.1}Co_{0.1}O_2$, $LiMn_2O_4$, $LiNi_{0.5}Mn_{1.5}O_4$, $LiFePO_4$, $LiFe_{0.5}Mn_{0.5}PO_4$, $LiMnPO_4$, $LiCoPO_4$, $LiNiPO_4$, $Li_3V_2(PO_4)_3$, $LiV_2O_5$, $LiVO_2$, $LiNb_2O_5$, $LiNbO_2$, $LiFeO_2$, $LiMgO_2$, $LiCaO_2$, $LiTiO_2$, $LiCrO_2$, $LiRuO_2$, $LiCuO_2$, $LiZnO_2$, $LiMoO_2$, $LiTaO_2$, or $LiWO_2$. These positive electrode materials may be used singly or in a combination of two or more.

The electrolyte solution is obtained by dissolving a supporting salt in a solvent. The solvent of the electrolyte solution is not particularly limited. Usable examples include cyclic carbonates, such as ethylene carbonate (EC), propylene carbonate (PC), and butylene carbonate; ethers, such as tetrahydrofuran; hydrocarbons, such as hexane; and lactones, such as γ-butyrolactone. Among these, in terms of discharge rate characteristics, a cyclic carbonate-based electrolyte solution, such as EC or PC, is preferable. The discharge rate is an index based on the "1C rate," which is a current value in which a cell having a nominal capacity is discharged at a constant current and fully discharged in 1 hour. For example, a current value in which the cell is fully discharged in 5 hours is expressed as a "0.2C rate," and a current value in which the cell is fully discharged in 10 hours is expressed as a "0.1C rate." On the other hand, the charge rate is an index based on the "1C rate," which is a current value in which a cell having a nominal capacity is charged at a constant current and fully charged in 1 hour. For example, a current value in which the cell is fully charged in 1 minute is expressed as a "60C rate," a current value in which the cell is fully charged in 6 minutes is expressed as a "10C rate," a current value in which the cell is fully charged in 5 hours is expressed as a "0.2C rate," and a current value in which the cell is fully charged in 10 hours is expressed as a "0.1C rate."

Since EC is generally solid at room temperature, EC alone does not function as an electrolyte solution. However, when EC is mixed with PC, dimethyl carbonate (DMC), diethyl carbonate (DEC), ethyl methyl carbonate (EMC), etc., to obtain a mixed solvent, it functions as an electrolyte solution that can also be used at room temperature.

As such a mixed solvent, EC (ethylene carbonate)-DEC (diethylene carbonate), EC-DMC (dimethyl carbonate), and EC-PC are preferably used, and EC-DEC and EC-PC are particularly preferably used.

The supporting salt of the electrolyte solution is not particularly limited, and salts generally used for lithium-ion batteries and lithium-ion capacitors can be used. Usable examples include $LiPF_6$, $LiBF_4$, $LiClO_4$, $LiTiF_4$, $LiVF_5$, $LiAsF_6$, $LiSbF_6$, $LiCF_3SO_3$, $Li(C_2F_5SO_2)_2N$, $LiB(C_2O_4)_2$, $LiB_{10}Cl_{10}$, $LiB_{12}Cl_{12}$, $LiCF_3COO$, $Li_2S_2O_4$, $LiNO_3$, $Li_2SO_4$, $LiPF_3(O_2F_5)_3$, $LiB(O_6F_5)_4$, $Li(CF_3SO_2)_3C$, and like salts. These salts may be used singly or in combination of two or more.

Among these, lithium hexafluorophosphate ($LiPF_6$) is preferably used. The use of $LiPF_6$ as a salt enhances the effects of improving the discharge capacity and cycle life of the positive electrode, and improving the cycle life of the negative electrode. The concentration of the electrolyte solution (the concentration of the salt in the solvent) is not particularly limited, but is preferably 0.1 to 3 mol/L, and more preferably 0.8 to 2 mol/L.

Although the structure of the lithium-ion battery or lithium-ion capacitor is not particularly limited, existing forms and structures, such as a stacked structure and a wound structure, can be used. That is, an electrode group in which a positive electrode and a negative electrode are stacked or wound so that they face each other through a separator is sealed in a state of being immersed in an electrolyte solution to form a secondary battery or a capacitor.

Power storage devices using the electrode material for a lithium-ion battery or a lithium-ion capacitor of the present disclosure (in particular, lithium-ion batteries or lithium-ion capacitors) have high capacity and high output. Accordingly, they can be used as power sources for various electric devices, such as air conditioners, washing machines, TVs, refrigerators, freezers, cooling equipment, laptop computers, tablet computers, smartphones, computer keyboards, computer displays, desktop computers, CRT monitors, computer racks, printers, integrated computers, mice, hard disks, computer peripherals, clothes irons, clothes dryers, window fans, transceivers, blowers, ventilation fans, music recorders, music players, ovens, cooking ranges, toilet seats with washing function, warm-air heaters, car parts, car navigation systems, flashlights, humidifiers, portable karaoke machines, dryers, air purifiers, mobile phones, emergency lights, game machines, sphygmomanometers, coffee mills, coffee makers, kotatsu heaters, copy machines, disc changers, radios, shavers, juicers, shredders, water purifiers, lighting equipment, dehumidifiers, dish dryers, rice cookers, stereos, stoves, speakers, trouser presses, vacuum cleaners, body fat scales, weight scales, health meters, movie players, electric carpets, electric rice cookers, electric razors, table lamps, electric pots, electronic game machines, portable game machines, electronic dictionaries, electronic notebooks, microwave ovens, electromagnetic cookers, calculators, electric carts, electric wheelchairs, electric tools, electric toothbrushes, electric footwarmers, haircut appliances, telephones, clocks, intercoms, air circulators, electric insecticides, copiers, hot plates, toasters, dryers, electric drills, water heaters, panel heaters, grinders, soldering irons, video cameras, video decks, fax machines, fan heaters, food processors, futon dryers, headphones, hot carpets, microphones, massage machines, miniature-bulbs, mixers, sewing machines, mochi machines, floor heating panels, lanterns, remote controllers, cold storage, water coolers, refrigeration stockers, cold-air blowers, word processors, whisks, GPS, electronic musical instruments, motorcycles, toys, lawn mowers, rods, bicycles, motorcycles, automobiles, hybrid vehicles, plug-in hybrid vehicles, electric vehicles, railways, ships, airplanes, submersibles, aircrafts, satellites, and emergency power systems.

EXAMPLES

Embodiments of the present invention are described below; however, the present invention is not limited to these embodiments. The electrodes of the present disclosure include a lithium-ion battery electrode and a lithium-ion capacitor electrode. In this Example, a lithium-ion battery is produced and tested, as described later. A lithium-ion capacitor can be produced in the same manner as for the lithium-ion battery, except that the operation of the counter electrode is mainly different. Specifically, for example, a lithium-ion capacitor can be produced in the same manner as for the battery described later, except that a conventional lithium-ion capacitor positive electrode is used as a positive electrode, and the electrode of the present disclosure is used as a negative electrode.

When the electrode of the present disclosure is used as a lithium-ion capacitor electrode, the counter electrode can be, for example, an electrode produced by applying a slurry comprising activated carbon, a binder, and a conductive aid to aluminum foil, followed by heat treatment.

The activated carbon of such a lithium-ion capacitor is preferably a carbon material having numerous fine pores and a large specific surface area. In a general production method, activated carbon is obtained by heating a carbon material, such as petroleum coke, and an alkali metal compound, such as potassium hydroxide, in a non-oxygen atmosphere at 600 to 1500° C. to allow the alkali metal to penetrate between graphite crystal layers to cause a reaction for activation. The median diameter (D50) of the activated carbon particles is preferably 0.5 to 30 µm.

Comparative Example 1

(1) Synthesis of Electrode Material

Figure 3:
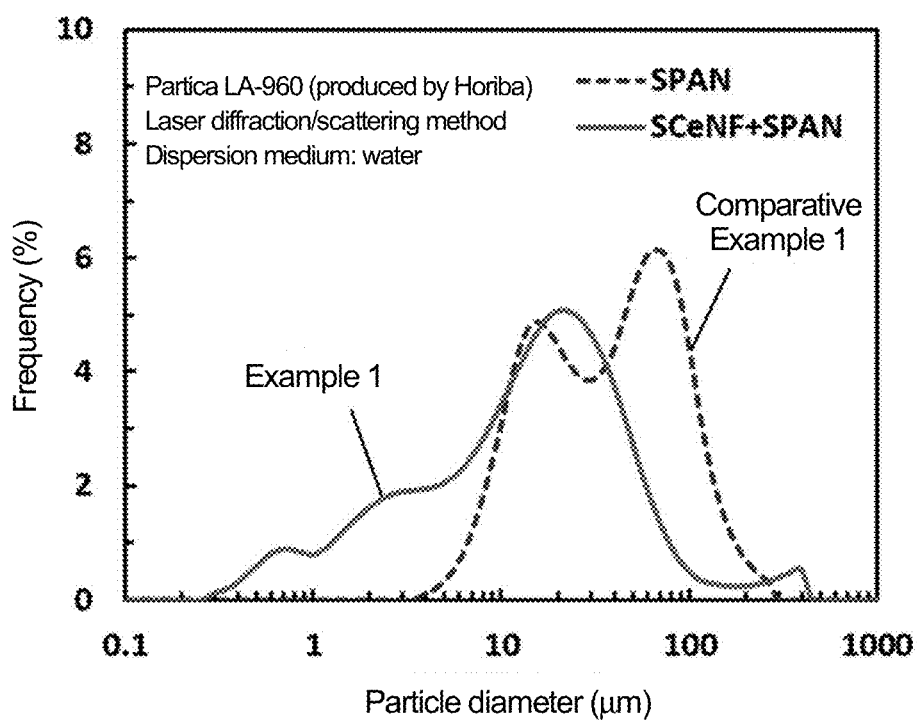
FIG. 3: A diagram showing the volume-based particle size distributions of the powders obtained in Example 1 and Comparative Example 1.

Sulfur and polyacrylonitrile were mixed at a weight ratio of sulfur:polyacrylonitrile=1:5, and the resulting mixture was heated at 350° C. for 5 hours. After the heating was completed, the mixture was ground using a stirring crusher and classified through a 325-mesh sieve (aperture: 45 µm). After classification, the mixture was heated in a nitrogen gas atmosphere at 300° C. for 5 hours and subjected to desulfurization treatment to obtain a sulfur-modified compound powder (S-PAN). The obtained powder had a median diameter (D50) of 36.3 µm. This value was obtained based on the data shown in FIG. 3 provided later.

Evaluation of Dispersibility in Water

Figure 2:
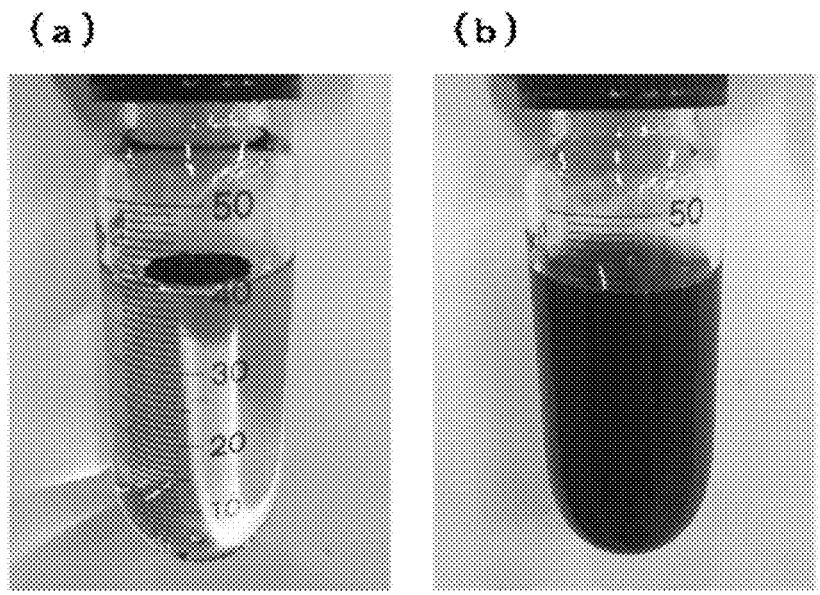
FIG. 2: Diagrams showing the water dispersibility of prototype powders. (a) shows the evaluation results of the water dispersibility of a sulfur-modified compound powder of Comparative Example 1, and (b) shows the evaluation results of the water dispersibility of a composite powder of Example 1.

The obtained powder was put in a glass bottle containing water in an amount 100 times the weight of the powder, the lid was closed, and the bottle was shaken well for about 1 minute. FIG. 2 shows a photograph of the bottle immediately after shaking, and Table 1 shows the results.

Volume-Based Particle Size Distribution

The volume-based particle size distribution of the obtained powder was measured by a laser diffraction/scattering method using water as a dispersion medium. As the measuring device, "LA-960" produced by Horiba was used. Measurement was performed using laser beams with wavelengths of 650 nm and 405 nm. FIG. 3 shows the results.

(2) Production of Test Electrode

The obtained sulfur-modified compound powder, acetylene black (AB), vapor-grown carbon fibers (VGCFs), and an acrylic resin binder were kneaded by a self-revolving mixer (2000 rpm, 40 minutes) at a ratio of sulfur-modified compound powder:acetylene black (AB):vapor-grown carbon fibers (VGCFs):acrylic resin binder=82:3:8:7 mass % until they were sufficiently dispersed in water, thereby forming a slurry (solid ratio: 35%). The obtained slurry was applied as a current collector to aluminum foil having a thickness of 20 µm, and dried under reduced pressure at 160° C. for 12 hours to thereby obtain a test electrode. The sulfur-modified compound powder was used as an active material. As described later, the obtained test electrode was used as a positive electrode, and the amount of slurry applied was adjusted so that the capacity of the positive electrode per unit area of one surface of the positive electrode was 1 mAh/cm$^2$.

(3) Production of Battery

A battery was produced using the obtained test electrode as a positive electrode, and a charge/discharge test was performed. The details are as follows. For the charge/discharge test, a CR2032 coin cell comprising the obtained test electrode as a positive electrode, a glass filter (GA-100 glass fiber filter, produced by Advantec) as a separator, metal lithium as a negative electrode, and 1 M LiPF$_6$ (ethylene carbonate (EC):diethyl carbonate (DEC)=50:50 vol % solution) as an electrolyte solution, was produced.

Charge/Discharge Test

Figure 4:
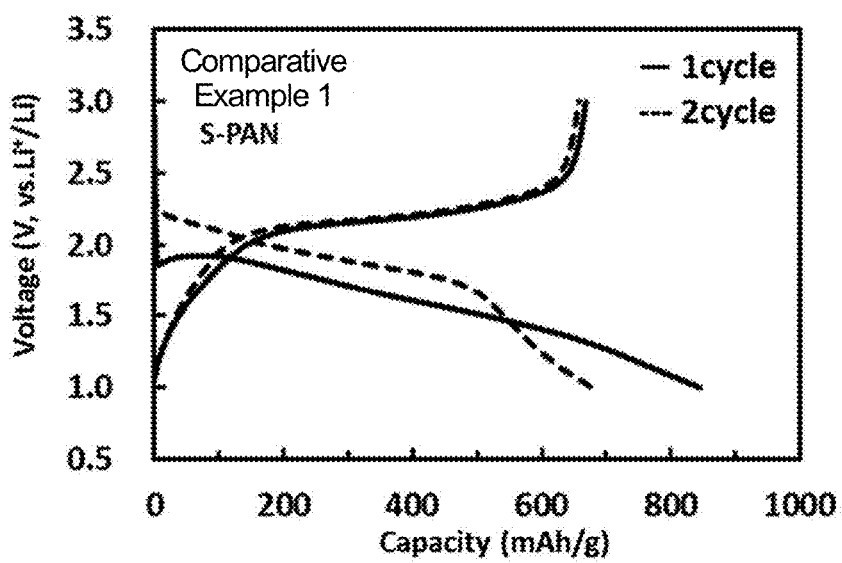
FIG. 4: A graph showing the charge/discharge curves of the battery produced in Comparative Example 1.

The obtained battery was subjected to a charge/discharge test. The charge/discharge test conditions were as follows: environmental temperature: 30° C., cut-off potential: 1.0 to 3.0 V (vs. Li/Li$^+$), and charge/discharge current rate: 0.2C rate. FIG. 4 shows charge/discharge curves. This clarifies the cycle life characteristics of the electrode. Table 1 shows the results of discharge capacity.

High-Temperature Shelf Test

A laminate cell was produced using the obtained test electrode, and the laminate cell was subjected to a high-temperature shelf test. The details are as follows. A laminate cell comprising the obtained test electrode as a positive electrode, a polypropylene microporous membrane (thickness: 20 µm) as a separator, SiO with an electrochemically cancelled irreversible capacity as a negative electrode, and 1 M LiPF$_6$ (ethylene carbonate (EC):diethyl carbonate (DEC)=50:50 vol % solution) as an electrolyte solution, was produced. The produced laminate cell was charged to 3.0 V at a 0.1C rate, and then left for 1 week in a 60° C. environment. Table 1 shows the results.

Reference Example 1

A battery was produced and subjected to a charge/discharge test in the same manner as in Comparative Example 1, except that a sulfur-modified cellulose nanofiber powder obtained by the following method was used as the sulfur-modified compound powder. Table 1 shows the results.

A mixture of CeNFs (product name: Rheocrysta I-2SX, produced by DKS Co. Ltd.) and sulfur at a weight ratio of 1:5 was heated at 350° C. for 5 hours, ground, and then classified through a 325-mesh sieve (aperture: 45 µm), thereby obtaining a sulfur-modified cellulose nanofiber powder.

Example 1

Figure 5:
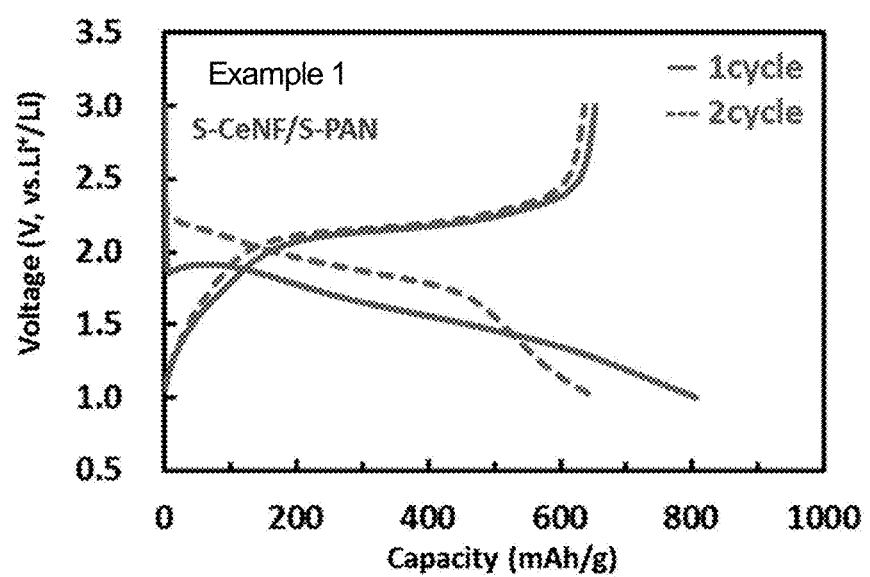
FIG. 5: A graph showing the charge/discharge curves of the battery produced in Example 1.

A battery was produced in the same manner as in Comparative Example 1, except that a composite powder obtained by the following method was used as the sulfur-modified compound powder. Evaluation of the dispersibility in water of the composite powder obtained in the process up to the production of the battery, the charge/discharge test of the battery, and the high-temperature shelf test of the electrode were performed. Table 1 and FIGS. 2, 3, and 5 show the results.

The sulfur-modified polyacrylonitrile powder obtained in Comparative Example 1, cellulose nanofibers (CeNFs), and sulfur were mixed at a weight ratio of sulfur-modified polyacrylonitrile powder:cellulose nanofibers (CeNFs):sulfur=94:1:5, and the resulting mixture was heated at 350° C. for 5 hours. After the heating was complicated, the mixture was ground using a stirring crusher and classified through a 325-mesh sieve (aperture: 45 µm), thereby obtaining a composite powder (S-CeNF+S-PAN) in which sulfur-modified cellulose was supported or coated on the surface of the sulfur-modified polyacrylonitrile powder. The obtained powder had a median diameter (D50) of 14.2 µm. This value was obtained based on the data shown in FIG. 3.

TABLE 1

|  | Dispersibility in water | Discharge capacity (mAh/g) | | | Stability |
| --- | --- | --- | --- | --- | --- |
|  |  | 1 cycle | 50 cycles | 100 cycles |  |
| Example 1 | Excellent | 652 | 624 | 620 | No battery swelling |
| Comparative Example 1 | Not dispersed | 674 | 646 | 641 | No battery swelling |
| Reference Example 1 | — | 353 | 324 | 287 | — |

As is clear from FIGS. 2 and 3, Example 1 shows superior water dispersibility to Comparative Example 1. The powder of Comparative Example 1 has a narrower peak at a larger particle diameter than the powder of Example 1, and the powder of Example 1 has a wider peak at a smaller particle diameter. This suggests that the powder of Example 1 is sufficiently dispersed in water. Further, as is clear from Table 1, the electrode of Comparative Example 1 had a decrease in discharge capacity of about 4.9% from 674 mAh/g in 1 cycle to 641 mAh/g in 100 cycles, whereas the electrode of Example 1 had a decrease in discharge capacity of about 4.9% from 652 mAh/g in 1 cycle to 620 mAh/g in 100 cycles, and showed reversible capacity and cycle life characteristics similar to those of the electrode of Comparative Example 1. The electrode of Reference Example 1 had a decrease in discharge capacity of about 19% from 353 mAh/g in 1 cycle to 287 mAh/g in 100 cycles, and had a certain level of excellent cycle life characteristics; however, it was indicated that the capacitance was particularly lower than the capacity exceeding 600 mAh/g of Example 1 and Comparative Example 1. The batteries using the electrodes of Example 1 and Comparative Example 1 showed no significant visual change, and no battery swelling due to gas generation was confirmed.

The invention claimed is:

1. An electrode material for a lithium-ion battery or a lithium-ion capacitor,
   the electrode material comprising a composite powder in which a B component is supported or coated on a surface of an A component,
   the A component comprising a material capable of electrochemically occluding and releasing lithium ions,
   the B component being sulfur-modified cellulose, and
   the B component being contained in an amount of 0.01 mass % or more based on 100 mass % of the total amount of the A component and the B component.

2. The electrode material for a lithium-ion battery or a lithium-ion capacitor according to claim 1, wherein the sulfur-modified cellulose is sulfur-modified cellulose nanofibers.

3. The electrode material for a lithium-ion battery or a lithium-ion capacitor according to claim 2, wherein the sulfur-modified cellulose nanofibers have a maximum fiber diameter of 1 μm or less.

4. The electrode material for a lithium-ion battery or a lithium-ion capacitor according to claim 1, wherein the electrode material further comprises a conductive material, and the conductive material is contained in an amount of 0.1 mass % or more and 30 mass % or less based on 100 mass % of the total amount of the A component, the B component, and the conductive material.

5. The electrode material for a lithium-ion battery or a lithium-ion capacitor according to claim 1, wherein the material capable of electrochemically occluding and releasing lithium ions is sulfur or a sulfur-based organic material.

6. The electrode material for a lithium-ion battery or a lithium-ion capacitor according to claim 1, wherein the material capable of electrochemically occluding and releasing lithium ions is sulfur-modified polyacrylonitrile.

7. An electrode for a lithium-ion battery or a lithium-ion capacitor, the electrode comprising the electrode material according to claim 1.

8. An electrode for a lithium-ion battery or a lithium-ion capacitor, the electrode comprising the electrode material according to claim 1 and a current collector.

9. The electrode for a lithium-ion battery or a lithium-ion capacitor according to claim 7, wherein the electrode contains a binder, and the binder is an aqueous binder.

10. A lithium-ion battery or a lithium-ion capacitor, each comprising a positive electrode, a negative electrode, and an electrolyte interposed between the positive electrode and the negative electrode, wherein the positive electrode or the negative electrode is the electrode according to claim 7.

11. An electric device having the lithium-ion battery or lithium-ion capacitor according to claim 10.

12. A method for producing the electrode material for a lithium-ion battery or a lithium-ion capacitor according to claim 1, the method comprising the step of heating the material capable of electrochemically occluding and releasing lithium ions, a cellulose material, and sulfur to 200° C. or higher and 800° C. or lower in a state in which they are brought into contact with each other.

13. The method for producing the electrode material for a lithium-ion battery or a lithium-ion capacitor according to claim 12, wherein the material capable of electrochemically occluding and releasing lithium ions is sulfur-modified polyacrylonitrile.

14. The method for producing the electrode material for a lithium-ion battery or a lithium-ion capacitor according to claim 12, further comprising, after the heating step, the step of heating to 250° C. or higher under reduced pressure or in an inert gas atmosphere.

15. The method for producing the electrode material for a lithium-ion battery or a lithium-ion capacitor according to claim 12, wherein a conductive material is mixed after the step of heating the material capable of electrochemically occluding and releasing lithium ions, a cellulose material, and sulfur to 200° C. or higher and 800° C. or lower in a state in which they are brought into contact with each other, or after the step of heating to 250° C. or higher under reduced pressure or in an inert gas atmosphere.

16. The method for producing the electrode material for a lithium-ion battery or a lithium-ion capacitor according to claim 12, wherein the cellulose material is cellulose nanofibers having a maximum fiber diameter of 1 μm or less.

* * * * *